United States Patent
Zeibig et al.

(10) Patent No.: US 12,228,199 B1
(45) Date of Patent: Feb. 18, 2025

(54) ELECTRIC DRIVE SYSTEM FOR A MOTOR VEHICLE

(71) Applicant: MERCEDES-BENZ GROUP AG, Stuttgart (DE)

(72) Inventors: Jonathan Zeibig, Aalen (DE); Tobias Schilder, Ludwigsburg (DE); Tobias Haerter, Stuttgart (DE); Carsten Gitt, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/716,670

(22) PCT Filed: Nov. 8, 2022

(86) PCT No.: PCT/EP2022/081029
§ 371 (c)(1),
(2) Date: Jun. 5, 2024

(87) PCT Pub. No.: WO2023/104413
PCT Pub. Date: Jun. 15, 2023

(30) Foreign Application Priority Data

Dec. 6, 2021 (DE) .................. 10 2021 006 012.1

(51) Int. Cl.
*B60K 1/02* (2006.01)
*B60K 17/16* (2006.01)
(Continued)

(52) U.S. Cl.
CPC ............ *F16H 48/10* (2013.01); *B60K 1/02* (2013.01); *B60K 17/165* (2013.01); *F16H 48/38* (2013.01);
(Continued)

(58) Field of Classification Search
CPC ..... B60K 1/02; B60K 2001/001; F16H 48/36; F16H 2048/104; F16H 2048/106; F16H 2048/364; F16H 2200/0021
See application file for complete search history.

(56) References Cited

U.S. PATENT DOCUMENTS 11,491,869 B2 * 11/2022 Tsukada .................. B60K 1/02
2003/0181276 A1 * 9/2003 Minagawa ............. B60K 6/445
903/910
(Continued)

FOREIGN PATENT DOCUMENTS

DE 102008038084 A1 * 2/2010 ............. F16H 3/666
DE 102014112602 A1 * 3/2016 ............... B60K 1/00
(Continued)

OTHER PUBLICATIONS

International Search Report and Written Opinion mailed Feb. 14, 2023 in related/corresponding International Application No. PCT/EP2022/081029.
(Continued)

*Primary Examiner* — Sherry L Estremsky
(74) *Attorney, Agent, or Firm* — PATENT PORTFOLIO BUILDERS PLLC

(57) ABSTRACT

An electric drive system for a motor vehicle includes a first electric engine having a first rotor, a second electric engine having a second rotor, and a planetary transmission, which has a first planetary gear set, a second planetary gear set, a first input shaft, a second input shaft, a first output shaft and a second output shaft. The first input shaft is designed to introduce first torques originating from the first electric engine into the planetary transmission. The second input shaft is designed to introduce second torques originating from the second electric engine into the planetary transmission. The first output shaft is designed to divert third torques
(Continued)

from the planetary transmission. The second output shaft is designed to divert fourth torques from the planetary transmission.

6 Claims, 1 Drawing Sheet

(51) Int. Cl.
*F16H 48/10* (2012.01)
*F16H 48/38* (2012.01)
*F16H 57/037* (2012.01)
*F16H 48/36* (2012.01)
*F16H 57/02* (2012.01)

(52) U.S. Cl.
CPC ........... *F16H 57/037* (2013.01); *F16H 48/36* (2013.01); *F16H 2048/364* (2013.01); *F16H 2057/02034* (2013.01); *F16H 2057/02052* (2013.01)

(56) References Cited

U.S. PATENT DOCUMENTS

| | | |
|---|---|---|
| 2007/0249456 A1 | 10/2007 | Meixner |
| 2015/0065282 A1 | 3/2015 | Honda et al. |
| 2024/0308324 A1* | 9/2024 | Gitt .......................... B60K 6/48 |

FOREIGN PATENT DOCUMENTS

| | | |
|---|---|---|
| DE | 102019107538 A1 | 10/2020 |
| JP | 2008215519 A | 9/2008 |
| JP | 5972807 B2 | 8/2016 |
| JP | 2019158070 A | 9/2019 |

OTHER PUBLICATIONS

Office Action created Aug. 2, 2022 in related/corresponding DE Application No. 10 2021 006 012.1.

* cited by examiner

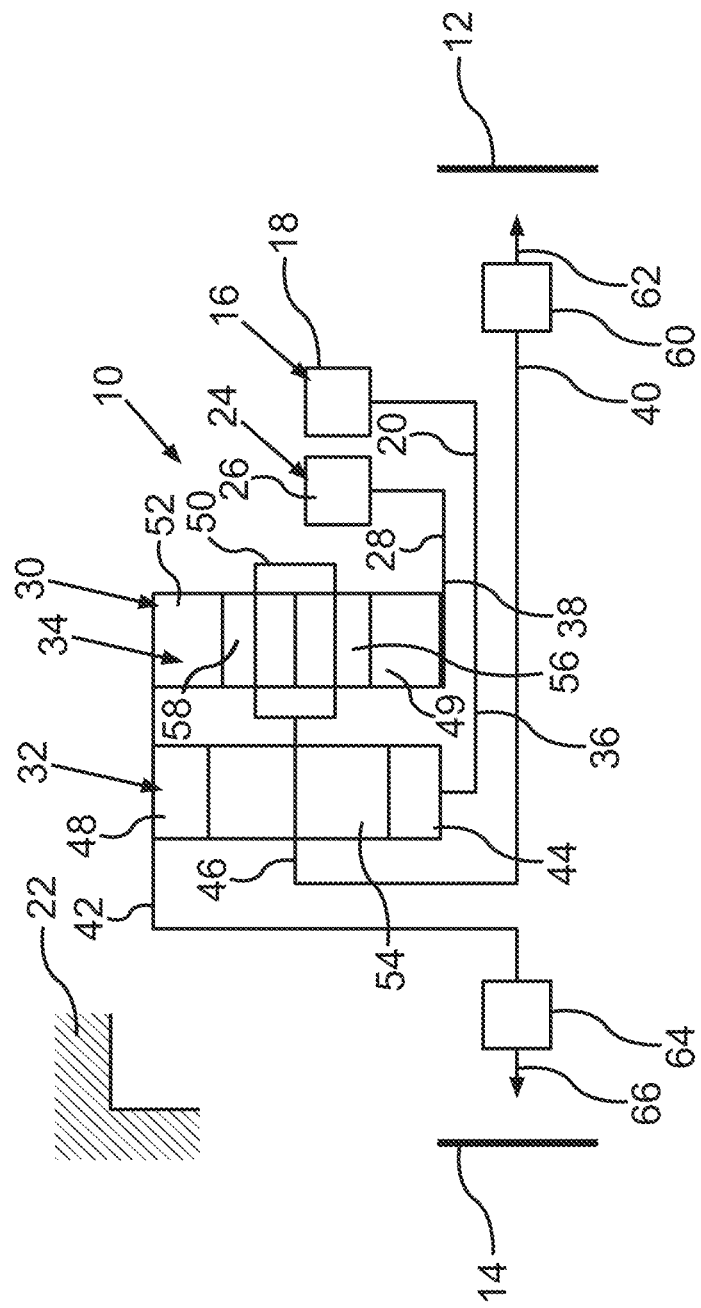

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle.

A drive engine for driving two rotating shafts should be taken as known from US 2015/_0_065_282 A1.

In addition, electric drive systems for motor vehicles respectively having two electric drive engines, which are respectively coupled with each other via a planetary transmission, are known from JP 2008-215 519 A and from the generic US 2007/0 249 456 A1.

Exemplary embodiments of the present invention are directed to an electric drive system for a motor vehicle having a particularly compact structure.

The invention relates to an electric drive system, also described as an electric drive device or designed as an electric drive device, for a motor vehicle, in particular for a motor car. This means that in its fully produced state, the motor vehicle has the electric drive system and can be driven electrically, in particular purely electrically, by means of the electric drive system. In particular, the motor vehicle, for example in its fully produced state, has at least or exactly two axles, which are arranged one after the other, and thus one behind the other, in the longitudinal direction of the vehicle. For example, the respective axle has at least or exactly two wheels, also described as vehicle wheels, where, preferably, the wheels of the respective axle are arranged on opposite sides to each other in the transverse direction of the vehicle. The wheels are ground contact elements, via which the motor vehicle is or can be supported downwards in the vertical direction of the vehicle on a ground. For example, the electric drive system is assigned to at least one of the axles or exactly one of the axles, such that, for example, the wheels of at least or exactly one of the axles can be driven by means of the electric drive system. The wheels that can be driven by means of the electric drive system are also described as drive wheels. If the drive wheels, and thus the motor vehicle, are driven by means of the electric drive system, while the motor vehicle is supported downwards in the vertical direction of the vehicle on the ground via the wheels, then the motor vehicle is driven along the ground, and the wheels roll along the ground.

The electric drive system has a first electric engine having a first rotor. For example, the first electric engine has a first stator, by means of which the first rotor can be driven, and thus can be rotated around a first engine axis of rotation relative to the first stator. The electric drive system additionally has a second electric engine having a second rotor. For example, the second electric engine has a second stator, by means of which the second rotor can be driven, and thus can be rotated around a second engine axis of rotation relative to the second stator. The electric drive system additionally has at least or exactly one planetary transmission, which has a first planetary gear set, a second planetary gear set, a first input shaft, a second input shaft, a first output shaft, and a second output shaft. The first input shaft is designed to introduce first torques originating from the first electric engine, in particular from the first rotor, into the planetary transmission. This can, in particular, be understood to mean that the first electric engine, in particular via its first rotor, can provide the first torques, which can be introduced into the planetary transmission via the first input shaft. The planetary transmission can thus in particular be driven. The second input shaft is designed to introduce second torques originating from the second electric engine, in particular from the second rotor, into the planetary transmission. This can, in particular, be understood to mean that the second electric engine, in particular via its second rotor, can provide the second torques, which can be introduced into the planetary transmission via the second input shaft, in particular while bypassing the first input shaft. For example, the planetary transmission can thus be driven. It is further conceivable that the first torques can be introduced into the planetary transmission via the first input shaft while bypassing the second input shaft. This can, in particular, be understood to mean the following: The first torques that are or can be provided by the first electric engine, in particular by the first rotor, do not, for example, run or flow via the second input shaft on their way from the first electric engine, in particular from the first rotor, into the planetary transmission, and thus the first torques bypass the second input shaft such that, for example, the second input shaft is not arranged in the first torque transmission path, or at least not in the first torque transmission path between the first electric engine and the planetary transmission, in relation to a first torque transmission path via which the first torques provided by the first electric engine, in particular by the first rotor, can be transmitted from the first electric engine, in particular from the first rotor, to the first input shaft and introduced into the planetary transmission via the first input shaft. The same applies to the second electric engine and the second torques. The second torques that are or can be provided by the second electric engine, in particular by the second rotor, do not, for example, run or flow via the first input shaft on their way from the second electric engine, in particular from the second rotor, into the planetary transmission, and thus the second torques bypass the first input shaft such that, for example, the first input shaft is not arranged in the second torque transmission path, or at least not in the second torque transmission path between the second electric engine and the planetary transmission, in relation to a second torque transmission path via which the second torques provided by the second electric engine, in particular by the second rotor, can be transmitted from the second electric engine, in particular from the second rotor, to the second input shaft and introduced into the planetary transmission via the second input shaft.

The first output shaft is designed to divert third torques from the planetary transmission. For example, the third torques result from the first torques introduced into the planetary transmission and/or from the second torques introduced into the planetary transmission. The second output shaft is designed to divert fourth torques from the planetary transmission, in particular while bypassing the first output shaft, wherein, for example, the fourth torques result from the first torques introduced into the planetary transmission and/or from the second torques introduced into the planetary transmission. In particular, it is conceivable that the first output shaft is designed to divert the third torques from the planetary transmission while bypassing the second output shaft.

The first planetary gear set has a first sun gear which is connected, in particular permanently connected, to the first rotor for conjoint rotation therewith. The first planetary gear set further has a first planetary carrier which is connected, in particular permanently connected, to the first output shaft for conjoint rotation therewith, the first planetary carrier also being described as a first link. The first planetary transmission further has a first annular gear which is, in particular, permanently connected to the second output shaft for conjoint rotation therewith. In the context of the present disclosure, the feature that the two elements, e.g., the first sun gear and the first rotor, are connected to each other for conjoint rotation should be understood to mean that both elements are arranged coaxially with each other and are connected to each other such that they rotate, in particular around a shared element axis of rotation and/or relative to the housing element of the drive system, at the same angular velocity, in particular if the elements or one of the elements, and via one element the other element, is or are driven. In other words, in the context of the present invention, the term or expression "a connection for conjoint rotation of two rotatably mounted elements" means that the two elements are arranged coaxially with each other and are connected to each other such that they rotate at the same angular velocity. In the context of the present disclosure, the feature that two elements are connected to each other permanently for conjoint rotation should be understood to mean that rather than being assigned to a switch element, which can be switched between a coupled state, in which the elements are connected to each other for conjoint rotation, and a decoupled state, in which the switch element permits a relative rotation, in particular around the previously specified element axis of rotation, between the elements, the elements are always or constantly, i.e., permanently, connected to each other for conjoint rotation.

The second planetary gear set has a second sun gear that is connected to the second rotor for conjoint rotation therewith, the second sun gear preferably being permanently connected to the second rotor for conjoint rotation therewith. In addition, the second planetary gear set has a second planetary carrier that is permanently connected to the first planetary carrier for conjoint rotation therewith, the second planetary carrier also being described as a second link. In addition, the second planetary gear set, for example, has a second annular gear. The first sun gear, the first planetary carrier, and the first annular gear are first transmission elements of the first planetary gear set. The second sun gear, the second planetary carrier, and the second annular gear are second transmission elements of the second planetary gear set. Preferably, the second transmission elements are provided in addition to the first transmission elements. In particular if the respective first transmission element is not connected to a housing device for conjoint rotation therewith, e.g., the previously specified housing element of the drive system, the respective, first transmission element can for example be rotated around a first planetary gear set axis of rotation relative to the housing device, e.g., the previously specified housing element. Correspondingly, the respective, second transmission element can in particular be rotated around a second planetary gear set axis of rotation relative to the housing device, in particular if the respective second transmission element is not connected to the housing device for conjoint rotation therewith.

It is further provided in a manner known per se that the second annular gear of the second planetary gear set is connected, in particular permanently, to the first annular gear for conjoint rotation therewith.

According to the invention, it is provided that the first annular gear and the second annular gear have different gearing diameters, in particular different pitch diameters. A particularly high power can thus be achieved in a manner particularly favorable to installation space. Overall, a compact, and particularly high-performing electric drive system can thus be achieved, in which so-called torque vectoring or torque shifting is possible to a particularly great extent.

To be able to implement a particularly compact structure of the electric drive system, which is thus favorable to installation space, it is provided in one embodiment of the invention that the first planetary carrier is designed as a single planetary carrier having first planetary gears. This should, in particular, be understood to mean that the first planetary gears are rotatably mounted on the first planetary carrier, in particular such that the respective first planetary gear can be rotated around a respective first planetary gear axis of rotation relative to the first planetary carrier. It is, in particular, provided that the first planetary gear axes of rotation run in parallel with one another, and are spaced apart from one another. In particular, the first planetary gear axes of rotation are equally spaced apart from each other in pairs, in particular in the first peripheral direction of the first planetary gear set running around the first planetary gear set axis of rotation. It is preferably provided that the first planetary gears are designed identically in structure to one another, and are, in particular, arranged in the axial direction of the first planetary gear set at the same height, and in particular begin at the same first height, and end at the same second height, in particular when viewed in the axial direction of the first planetary gear set.

It has proved particularly advantageous if the second planetary carrier is designed as a double planetary carrier having second planetary gears and third planetary gears. This should, in particular, be understood to mean that the second planetary gears and the third planetary gears are rotatably mounted on the second planetary carrier, in particular such that the respective second planetary gear can be rotated around a respective second planetary gear axis of rotation relative to the second planetary carrier, and that the respective, third planetary gear can be rotated around a respective third planetary gear axis of rotation relative to the second planetary carrier. It is, in particular, conceivable that the second planetary gear axes of rotation run in parallel with one another and are spaced apart from one another, in particular in the second peripheral direction of the second planetary gear set running in particular around the second planetary gear set axis of rotation, wherein it is in particular conceivable that the second planetary gear axes of rotation are spaced apart from each other in pairs equally or identically in the second peripheral direction of the second planetary gear set. It is further conceivable that the third planetary gear axes of rotation run in parallel with one another and are spaced apart from one another, in particular in the second peripheral direction of the second planetary gear set. The third planetary gear axes of rotation are preferably spaced apart from each other in pairs equally or identically in the second peripheral direction of the second planetary gear set. For example, the second planetary gears can be identical in structure. It is further conceivable that the third planetary gears are identical in structure. For example, the third planetary gear axes of rotation run in parallel with the second planetary gear axes of rotation.

Thus, for example, the second planetary gears are arranged at the same height in the axial direction of the second planetary gear set, and thus the second planetary gears begin and end at respectively the same height when viewed in the axial direction of the second planetary gear set. As an alternative or in addition, for example, the third planetary gears are arranged at the same height in the axial direction of the second planetary gear set, such that, preferably, the third planetary gears begin and end at respectively the same height when viewed in the axial direction of the second planetary gear set. In particular, it is conceivable that the second planetary gears are identical in structure, i.e., are identical with regard to their construction. As an alternative or in addition, the third planetary gears can be identical in structure, i.e., with regard to their construction. It is in particular conceivable that the respective second planetary gear and the third respective planetary gear differ from each other with regard to their construction. As an alternative or in addition, it is conceivable that the respective second planetary gear and the respective third planetary gear are arranged at the same or different heights when viewed in the axial direction of the second planetary gear set, and thus begin at the same or at a different height or end at the same or a different height.

In addition, it is preferably provided that the first planetary gears are designed separately from the second planetary gears and separately from the third planetary gears.

For example, the second planetary gears engage with the second sun gear, wherein it is conceivable that the respective second planetary gear engages with none of the third planetary gears, and does not engage with the second annular gear. For example, the third planetary gears engage with the second annular gear, wherein it is conceivable that the respective third planetary gear engages with none of the third planetary gears, and does not engage with the second sun gear.

In a further, particularly advantageous embodiment of the invention, the planetary gear set, which is also described as a first planetary set, is designed for a stationary transmission ratio of +3. In other words, it is preferably provided that the first planetary gear set has a stationary transmission ratio of +3. It has proved particularly advantageous if the second planetary gear set, which is also described as a second planetary set, is designed for a stationary transmission ratio of −2, and thus has a stationary transmission ratio of −2. A construction which is particularly favorable to installation space can thus be achieved.

In a further, particularly advantageous embodiment of the invention, the electric drive system has a first transmission stage, which is also described as a first final drive. In relation to a first torque flow, along which the third torques can be diverted from the planetary transmission via the first output shaft, the first transmission stage is arranged in the first torque flow and downstream of the first output shaft, and thus connected downstream of the first output shaft. Expressed the other way round, the first output shaft is arranged in the first torque flow and upstream of the first transmission stage.

It has proved particularly advantageous if the electric drive system has a second transmission stage, which is also described as a second final drive. In relation to a second torque flow, along which the fourth torques can be diverted from the planetary transmission via the second output shaft, the second transmission stage is arranged downstream in the second torque flow, and downstream of the second output shaft. In other words, the second transmission stage is arranged in the second torque flow and connected downstream of the second output shaft. Expressed the other way round, the second output shaft is arranged in the second torque flow and upstream of the second transmission stage. It has proved particularly advantageous if the first transmission stage, the second transmission stage, the planetary gear sets, and the rotors are arranged in a shared housing of the electric drive system. In particular, the housing can be the previously specified housing element and/or the previously specified housing device. The respective transmission stage, for example, has at least or exactly two respective gearwheels, which can in particular be designed as spur gears. Preferably, the respective gearwheels of the respective transmission stage engage, in particular directly, with each other, such that, for example, the respective gearwheels form a respective spur gear stage or spur gear pair. By using the transmission stages, a particularly advantageous, and in particular a particularly advantageously large transmission ratio can be achieved in a manner particularly favorable to installation space.

To be able to keep the installation space requirement of the electric drive system particularly low, in a further embodiment of the invention, it is provided that the planetary transmission, the two rotors, and the two transmission stages are arranged coaxially with each other. It is preferably provided that the planetary gear sets are arranged coaxially with one another, such that the planetary gear set axes of rotation coincide. A coaxial arrangement of the rotors, i.e., that the rotors are arranged coaxially with one another, can in particular be understood to mean that the engine axes of rotation coincide. If, for example, the rotors are thus arranged coaxially with one another, and coaxially with the planetary gear sets, and thus coaxially with the planetary transmission, then the engine axes of rotation coincide, the planetary gear set axes of rotation coincide, and the respective planetary gear set axis of rotation coincides with the respective engine axis of rotation. Further, it is, for example, conceivable that the respective transmission stage has at least one transmission element which can, for example, be designed as a gearwheel, in particular as a spur gear. The respective transmission element of the respective transmission stage can be rotated relative to the housing, in particular around a transmission element axis of rotation. If the transmission stages are arranged coaxially with one another, then the transmission elements of the transmission stages are arranged coaxially with one another, such that the transmission element axes of rotation coincide. If the transmission stages are now arranged coaxially with one another, coaxially with the planetary transmission and coaxially with the rotors, then the planetary gear set axes of rotation, the engine axes of rotation and the transmission element axes of rotation all coincide, whereby a structure which is particularly favorable to installation space can be achieved.

To be able to keep the number of parts, and thus the weight, the costs, and the required installation space particularly low, in a further embodiment of the invention, it is provided that the planetary transmission has exactly two planetary gear sets, specifically the first planetary gear set and the second planetary gear set.

Finally, it has proved particularly advantageous if the first rotor is connected, in particular permanently, to the first sun gear for conjoint rotation therewith. It has further proved particularly advantageous if the second rotor is connected, in particular permanently, to the second sun gear for conjoint rotation therewith. A particularly compact structure can thus be achieved.

It is conceivable that the respective transmission stage is designed as a respective further planetary gear set. It is thus conceivable that the first transmission stage is designed as a third planetary gear set, and the second transmission stage is designed as a fourth planetary gear set, wherein the third planetary gear set is provided in addition to the first planetary gear set, in addition to the second planetary gear set and in addition to the fourth planetary gear set. In addition, the respective, previously specified transmission element is for example a respective sun gear or a respective annular gear or a respective planetary carrier of the respective third or fourth planetary gear set. It is further preferably provided that a respective input of the respective further planetary gear set, and thus the respective transmission stage is a respective further sun gear of the respective further planetary gear set. Thus, for example, the third torques diverted via the first output shaft from the planetary transmission, and in particular provided by the first output shaft, can be introduced into the first transmission stage via the input, and thus via the sun gear of the first transmission stage designed as the third planetary gear set. Furthermore, for example, the fourth torques diverted via the second output shaft from the planetary transmission, and in particular provided by the second output shaft, can be introduced into the second transmission stage via the input, and thus via the sun gear of the second transmission stage designed as the fourth planetary gear set. It has further proved advantageous if the respective further planetary carrier of the respective further planetary gear set, and thus the respective transmission stage, is a respective output or output drive of the respective transmission stage. Thus, for example, the first transmission stage designed as the third planetary gear set can provide fifth torques via its further planetary carrier, and thus derive or divert fifth torques from itself, wherein, for example, the fifth torques result from the third torques, which are or have been introduced into the first transmission stage, in particular via the further sun gear of the first transmission stage. In addition, for example, the second transmission stage designed as the fourth planetary gear set can thus further provide sixth torques via its further planetary carrier, and thus divert or derive the sixth torques from itself, wherein, for example, the sixth torques result from the fourth torques, which are or have been introduced into the second transmission stage, in particular via the further sun gear of the second transmission stage. It has further proved advantageous if the respective further annular gear of the respective transmission stage designed as the third or fourth planetary gear set is fixed in the housing, and is thus, in particular permanently, connected to the housing for conjoint rotation therewith, wherein the housing is for example the housing element and/or the housing device.

It has further proved particularly advantageous if the planetary transmission is designed or functions as a planetary differential transmission, in particular with a torque vectoring function. The torque vectoring function is also described as a torque distribution function. In particular, this can be understood to mean the following: The electric drive system, and thus the planetary transmission are assigned, in particular precisely to one of the axles, and thus the wheels of the one axle, such that the drive wheels can be driven by means of the electric engines via the planetary transmissions. Because the planetary transmission preferably functions or is designed as a planetary differential transmission, the planetary transmission, for example, permits the motor vehicle to drive around the bend at different rotational speeds of the drive wheels, in particular such that the drive wheel on the outside of the bend rotates or can rotate at a greater rotational speed than the drive wheel on the inside of the bend.

A motor vehicle preferably designed as a motor car is also disclosed, in particular the motor vehicle previously specified, wherein the motor vehicle has an electric drive system according to the invention. Advantages and advantageous embodiments of the electric drive system should be seen as advantages and advantageous embodiments of the motor vehicle and vice versa.

Further advantages, features and details of the invention result from the following description of a preferred exemplary embodiment and with reference to the drawing. The features and combinations of features previously specified in the description and the features and combinations of features specified in the following description of the FIGURE and/or shown only in the single FIGURE can be used not only in the specified combination, but also in other combinations or in isolation without leaving the scope of the invention.

BRIEF DESCRIPTION OF THE SOLE DRAWING FIGURE

The sole drawing FIGURE shows a schematic depiction of an electric drive system for a motor vehicle.

DETAILED DESCRIPTION

The single FIGURE shows, in a schematic depiction, an electric drive system 10 for a motor vehicle. In its fully produced state, the motor vehicle thus has the electric drive system 10, by means of which the motor vehicle can be driven electrically, in particular purely electrically. The motor vehicle has at least or exactly two axles arranged one after the other, and thus one behind the other in the longitudinal direction of the vehicle. The respective axle has at least or exactly two wheels also described as vehicle wheels, wherein the respective wheels of the respective axle are arranged on opposite sides of the motor vehicle in the transverse direction of the vehicle. For example, the drive system 10 is assigned to at least or exactly one of the axles, such that by means of the electric drive system 10, at least or only those wheels of the axle can be driven to which the electric drive system 10 has been assigned. The wheels, which can be driven by means of the electric drive system 10, are also described as drive wheels. The drive wheels are depicted particularly schematically in the FIGURE, and labelled 12 and 14. By driving the drive wheels 12 and 14, in particularly purely electrically, by means of the drive system 10, the motor vehicle can be driven electrically, in particular purely electrically.

The drive system 10 has a first electric engine 16, which has a first stator 18 and a first rotor 20. By means of the stator 18, the rotor 20 can be driven, and thus be rotated relative to the stator 18 around a first engine axis of rotation. The drive system 10 has a housing 22 depicted particularly schematically in the FIGURE, which is also described as a housing device or housing element. The rotor 20 can be rotated around the first engine axis of rotation relative to the stator 18 and relative to the housing 22. The drive system 10 additionally comprises a second electric engine 24, which has a second stator 26 and a second rotor 28. By means of the stator 26, the rotor 28 can be driven, and thus be rotated relative to the stator 26 and relative to the housing 22 around a second engine axis of rotation. In the exemplary embodiment shown in the FIGURE, the two specified electric engines 16 and 24 are arranged coaxially with each other, such that the engine axes of rotation coincide. The first electric engine 16 can provide first torques via its first rotor 20, and the second electric engine 24 can provide second torques via its second rotor 28.

The drive system 10 has a planetary transmission 30, which has a first planetary gear set 32, a second planetary gear set 34, a first input shaft 36, and a second input shaft 38. In addition, the planetary transmission 30 has a first output shaft 40 and a second output shaft 42. The first input shaft 36 is designed to introduce the first torques originating from the first electric engine 16, i.e., provided by the first electric engine 16 via the rotor 20, and thus by the first rotor 20 into the planetary transmission 30. The second input shaft 38 is designed to introduce the second torques originating from the second electric engine 24, i.e., provided by the second electric engine 24 via the rotor 28, and thus by the first rotor 28 into the planetary transmission 30. The first output shaft 40 is designed to divert third torques, which for example result from the first torques and/or second torques introduced into the planetary transmission 30, from the planetary transmission 30. The second output shaft 42 is designed to divert fourth torques, which for example result from the first torques and/or second torques introduced into the planetary transmission 30, from the planetary transmission 30.

The first planetary gear set 32 has a first sun gear 44 which is connected, in particular permanently, to the first rotor 20 for conjoint rotation therewith, and a first planetary carrier 46, which is connected, in particular permanently, to the first output shaft 40 for conjoint rotation therewith. In addition, the first planetary gear set 32 has a first annular gear 48, which is connected, in particular permanently, to the second output shaft 42 for conjoint rotation therewith. The first planetary gear set 34 has a second sun gear 49, which is connected, in particular permanently, to the second rotor 28 for conjoint rotation therewith. In addition, the second planetary gear set 34 has a second planetary carrier 50, which is connected, in particular permanently, to the first planetary carrier 46 for conjoint rotation therewith.

To be able to implement a particularly compact structure of the drive system 10 and a particularly advantageous driveability, the second planetary gear set 34 has a second annular gear 52, which is connected, in particular permanently connected, to the first annular gear 48 for conjoint rotation therewith.

Preferably, the first planetary carrier 46 is designed as a single planetary carrier, on which first planetary gears 54 are rotatably held. The respective first planetary gear 54 engages for example, in particular simultaneously, with the sun gear 44 and the annular gear 48. The second planetary carrier 50 is, for example, designed as a double planetary carrier, on which second planetary gears 56 and third planetary gears 58 are rotatably mounted. It is the case that the second planetary gears 56 engage with the sun gear 49, but do not engage with the annular gear 52, wherein it is the case that the third planetary gears 58 engage with the annular gear 52, but do not engage with the sun gear 49. The sun gear 49 thus engages with the planetary gears 56, and the planetary gears 58 engage with the annular gear 52, wherein the planetary gears 56 and 58 engage with each other. The planetary gears 56 further do not engage with the annular gear 52, and the planetary gears 58 do not engage with the sun gear 49. In addition, the first planetary gears 54 are designed separately from the second planetary gears 56 and separately from the third planetary gears 58.

It is further preferably provided that the annular gears 48 and 52 have different gearing diameters, in particular different pitch diameters.

It has further proved particularly advantageous if the first planetary gear set 32 is designed for a stationary transmission ratio of +3. It has further proved advantageous if the second planetary gear set 34 is designed for a stationary transmission ratio of −2.

The electric drive system 10 has a first transmission stage 60, which is arranged in the first torque flow downstream of the first output shaft 40 in relation to a first torque flow, along which the third torques can be diverted from the planetary transmission 30 via the first output shaft 40. In the first torque flow, a first side shaft 62 is for example arranged, which is arranged in the first torque flow, and downstream of the first transmission stage 60. The side shaft 62 can be driven by the output shaft 40 via the transmission stage 60, wherein the wheel 12 can be driven by the side shaft 62, and thus via the side shaft 62 by the transmission stage 60. The drive system 10 additionally comprises a second transmission stage 64, which is arranged in the second torque flow downstream of the second output shaft 42 in relation to a second torque flow, along which the fourth torques can be diverted from the planetary transmission 30 via the second output shaft 42. In the second torque flow, downstream of the transmission stage 64, a second side shaft 66 is arranged, wherein the wheel 14 can be driven via the side shaft 66 of the transmission stage 64. In addition, the side shaft 66 can be driven by the output shaft 42 via the transmission stage 64. Consequently, the side shaft 62 can be driven by the output shaft 40 via the transmission stage 60. The respective transmission stage 60, 64 is also described as a final drive (FD). Preferably, the transmission stage 60 is a third planetary gear set, wherein it is conceivable that the transmission stage 64 is a fourth planetary gear set. Preferably, the third planetary gear set and the fourth planetary gear set are identical in structure, i.e., identical or similar with regard to their construction, and thus with regard to their transmission ratio.

It has further proved particularly advantageous if the transmission stages 60 and 64, the planetary gear sets 32 and 34, and the rotors 20 and 28 are arranged in the shared housing 22 of the electric drive system 10. In the exemplary embodiment shown in the FIGURE, it is additionally provided that the planetary transmission 30, the rotors 20 and 28 and the two transmission stages 60 and 64 are arranged coaxially with one another.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 10 electric drive system
12 drive wheel
14 drive wheel
16 first electric engine
18 first stator
20 first rotor
22 housing
24 second electric engine
26 second stator
28 second rotor
30 planetary transmission
32 first planetary gear set
34 second planetary gear set
36 first input shaft
38 second input shaft
40 first output shaft 42 second output shaft
44 first sun gear
46 first planetary carrier
48 first annular gear
49 second sun gear
50 second planetary carrier
52 second annular gear
54 first planetary gear
56 second planetary gear
58 third planetary gear
60 first transmission stage
62 first side shaft
64 second transmission stage
66 second side shaft

The invention claimed is:

1. An electric drive system for a motor vehicle, the electric drive system comprising:
a first electric engine having a first rotor;
a second electric engine having a second rotor; and
a planetary transmission having a first planetary gear set, a second planetary gear set, a first input shaft, a second input shaft, a first output shaft, and a second output shaft,
wherein the first input shaft is configured to introduce first torques originating from the first electric engine into the planetary transmission,
wherein the second input shaft is configured to introduce second torques originating from the second electric engine into the planetary transmission,
wherein the first output shaft is configured to divert third torques from the planetary transmission,
wherein the second output shaft is configured to divert fourth torques from the planetary transmission,
wherein the first planetary gear set has a first sun gear connected to the first rotor to conjointly rotate with the first rotor, a first planetary carrier connected to the first output shaft to conjointly rotate with the first planetary carrier, and a first annular gear connected to the second output shaft to conjointly rotate with the first annular gear,
wherein the second planetary gear set has a second sun gear connected to the second rotor to conjointly rotate with the second sun gear, and a second planetary carrier connected to the first planetary carrier to conjointly rotate with the second planetary carrier,
wherein the second planetary gear set has a second annular gear connected to the first annular gear to conjointly rotate with the second planetary gear set, and
wherein the first annular gear and the second annular gear have different gearing diameters.

2. The electric drive system of claim 1, wherein
the first planetary carrier is a single planetary carrier having first planetary gears,
the second planetary carrier is a double planetary carrier having second planetary gears and third planetary gears, and
the first planetary gears are configured separately from the second planetary gears and separately from the third planetary gears.

3. The electric drive system of claim 1, wherein
the first planetary gear set has a stationary transmission ratio of +3, and
the second planetary gear set has a stationary transmission ratio of −2.

4. The electric drive system of claim 1, further comprising:
a first transmission stage arranged in a first torque flow of the first torque downstream of the first output shaft in relation to the first torque flow, along which the third torques are diverted from the planetary transmission via the first output shaft, and
a second transmission stage arranged in a second torque flow of the second torque downstream of the second output shaft in relation to the second torque flow, along which the fourth torques are diverted from the planetary transmission via the second output shaft, wherein the first transmission stage, the second transmission stage, the planetary gear sets, and the rotors are arranged in a shared housing of the electric drive system.

5. The electric drive system of claim 4, wherein the planetary transmission, the two rotors and the first and second transmission stages are arranged coaxially with one another.

6. The electric drive system of claim 1, wherein the planetary transmission has exactly two planetary gear sets, which consist of the first planetary gear set and the second planetary gear set.

* * * * *